US011227456B1

(12) United States Patent
Carter

(10) Patent No.: US 11,227,456 B1
(45) Date of Patent: Jan. 18, 2022

(54) PEER TO PEER SALE LOCKER APPARATUS

(71) Applicant: Nicholas Carter, Virginia Beach, VA (US)

(72) Inventor: Nicholas Carter, Virginia Beach, VA (US)

(*) Notice: Subject to any disclaimer, the term of this patent is extended or adjusted under 35 U.S.C. 154(b) by 0 days.

(21) Appl. No.: 17/022,300

(22) Filed: Sep. 16, 2020

(51) Int. Cl.
*G07C 9/00* (2020.01)
*H04B 10/50* (2013.01)
*H04W 88/02* (2009.01)
*G06K 19/06* (2006.01)
*H04W 84/12* (2009.01)

(52) U.S. Cl.
CPC ..... *G07C 9/00912* (2013.01); *G07C 9/00309* (2013.01); *H04B 10/502* (2013.01); *G06K 19/06037* (2013.01); *H04W 84/12* (2013.01); *H04W 88/02* (2013.01)

(58) Field of Classification Search
CPC ............ G07C 9/00912; G07C 9/00309; H04B 10/502; H04W 88/02; H04W 84/12; G06K 19/06037
USPC ..................... 340/5.7, 5.73, 5.22; 379/102.06
See application file for complete search history.

(56) References Cited

U.S. PATENT DOCUMENTS

| 4,836,352 | A  | * | 6/1989 | Tateno ..................... G07F 17/12 177/25.15 |
| 4,894,717 | A  | * | 1/1990 | Komei ..................... G07C 9/253 348/150 |
| 6,323,782 | B1 | * | 11/2001 | Stephens .................. G07C 9/27 340/10.31 |
| 6,779,310 | B2 | * | 8/2004 | Grover .................... E04H 6/005 292/302 |
| 6,845,909 | B2 | * | 1/2005 | Bong .................... G06Q 10/087 235/375 |
| 6,879,243 | B1 | * | 4/2005 | Booth ..................... G07F 17/12 340/5.73 |
| 6,895,241 | B2 | * | 5/2005 | Hara ....................... G07F 17/12 455/420 |
| 7,176,782 | B2 | * | 2/2007 | Shitan ................. G07C 9/00309 340/5.2 |
| 7,945,032 | B2 | * | 5/2011 | Elberbaum ........... H04N 7/186 379/102.06 |
| 9,082,247 | B2 | * | 7/2015 | Turner ..................... G07F 7/00 |
| 9,706,835 | B2 | * | 7/2017 | Zaniker .................. A47B 81/00 |
| 9,745,130 | B1 | * | 8/2017 | Rawal ................ G06Q 10/0836 |
| 10,181,113 | B2 | * | 1/2019 | Rivalto ............... G07G 1/0036 |
| 10,198,887 | B2 |   | 2/2019 | Ogishi |
| 10,424,143 | B2 | * | 9/2019 | Miller ..................... G07F 17/12 |
| 10,474,797 | B2 | * | 11/2019 | Lowenthal .............. G07F 9/001 |
| 10,607,433 | B2 | * | 3/2020 | Danson .................. A47B 61/04 |

(Continued)

*Primary Examiner* — Nam V Nguyen

(57) ABSTRACT

A peer to peer sale locker apparatus for allowing safe peer to peer transactions for physical goods includes a front locker frame and a central housing coupled to the front locker frame. A central CPU is coupled within the central housing. A central power source, a display, a scanner, a central transmitter, a central receiver, and a Wi-Fi transceiver are coupled within the central housing and are in operational communication with the central CPU. A plurality of locker units is coupled within the front locker frame. Each locker unit comprises a locker body and a locker door hingingly coupled to the locker body. An electronic lock is coupled to the locker door to lock and unlock the locker door to the locker body to allow sellers and buyers to access a locker unit.

8 Claims, 7 Drawing Sheets

(56) References Cited

U.S. PATENT DOCUMENTS

| | | | |
|---|---|---|---|
| 2006/0217835 A1* | 9/2006 | Stobbe | G07C 9/00896 700/214 |
| 2012/0086314 A1* | 4/2012 | Bourke | G07F 17/12 312/109 |
| 2014/0138338 A1* | 5/2014 | Moritz | A47B 61/00 211/186 |
| 2015/0343494 A1* | 12/2015 | Lossov | H05K 5/0221 414/800 |
| 2018/0060800 A1 | 3/2018 | Robinson | |
| 2018/0091503 A1* | 3/2018 | Tang | G07C 9/00912 |
| 2018/0101820 A1 | 4/2018 | Peyner | |
| 2019/0026968 A1* | 1/2019 | Tartal | G07C 9/00944 |
| 2019/0164114 A1 | 5/2019 | Kadotani | |
| 2019/0220815 A1 | 7/2019 | Nelson | |
| 2019/0259232 A1 | 8/2019 | Nandakumar | |

\* cited by examiner

PEER TO PEER SALE LOCKER APPARATUS

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION

(1) Field of the Invention

The disclosure relates to locker device and more particularly pertains to a new locker device for allowing safe peer to peer transactions for physical goods.

(2) Description of Related Art Including Information Disclosed Under 37 CFR 1.97 and 1.98

The prior art relates to locker devices. Existing devices allow remote access of packages for package delivery and pickup. These devices, however, are not designed for peer to peer transactions and thus lack verification methods, such as weight pressure sensors and cameras, to ensure the stored item is valid. Known devices also lack locker frames to face lockers in three different directions, and lack lockers large enough to receive a bicycle or other commonly traded large item.

BRIEF SUMMARY OF THE INVENTION

An embodiment of the disclosure meets the needs presented above by generally comprising a front locker frame and a central housing coupled to the front locker frame. A central CPU is coupled within the central housing. A central power source, a display, a scanner, a central transmitter, a central receiver, and a Wi-Fi transceiver are coupled within the central housing and are in operational communication with the central CPU. A plurality of locker units is coupled within the front locker frame. Each locker unit comprises a locker body and a locker door hingingly coupled to the locker body. An electronic lock is coupled to the locker door. The electronic lock has a locker receiver in operational communication with the central transmitter. The electronic lock selectively locks and unlocks the locker door to the locker body. A locker CPU is coupled within the locker body. The locker CPU is in operational communication with the electronic lock. A locker transmitter is coupled within the locker body. The locker transmitter is in operational communication with the central receiver. A locker power source is coupled within the locker body. The locker power source is in operational communication with the locker CPU.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

DETAILED DESCRIPTION OF THE INVENTION

Figure 1:
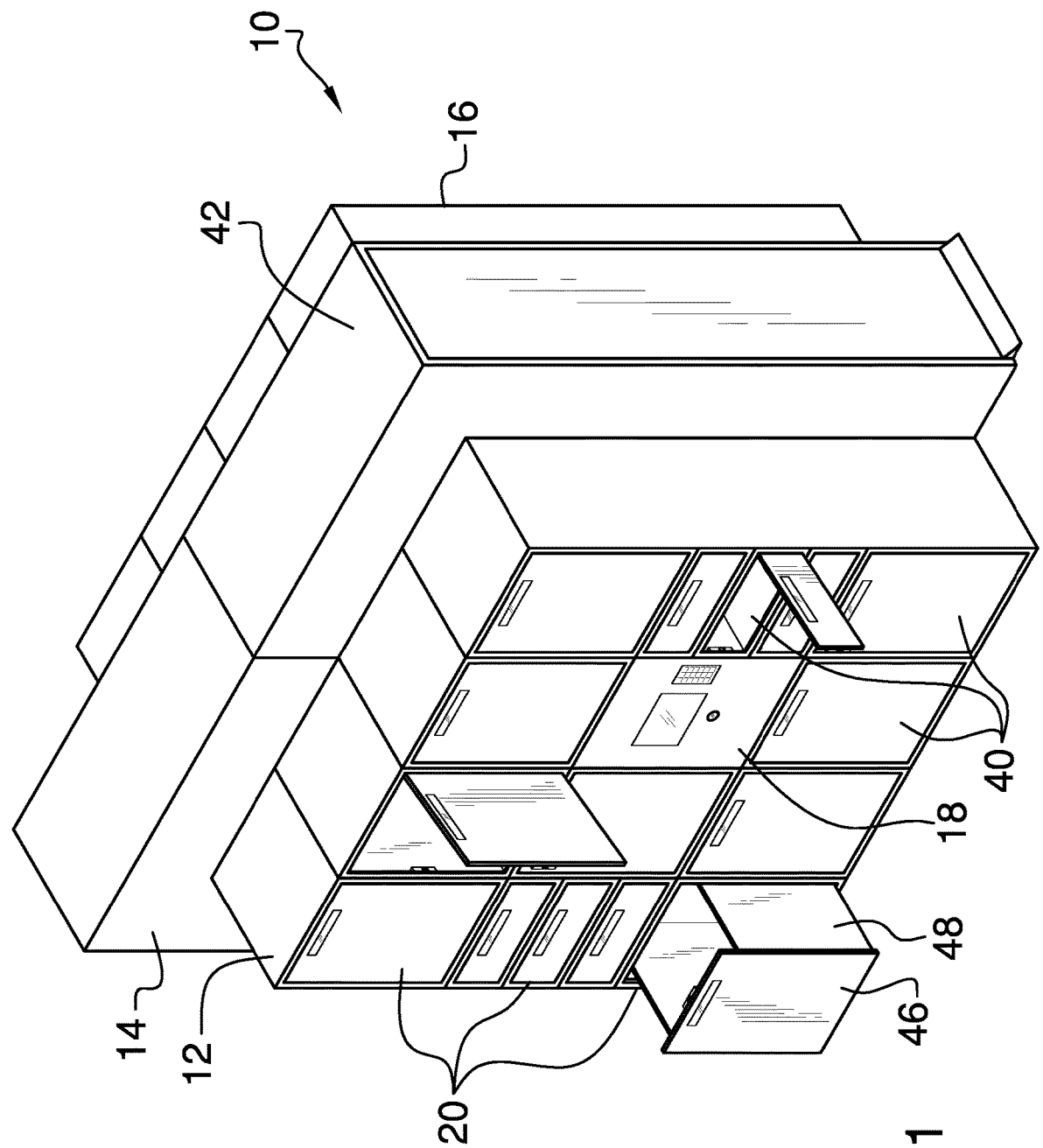
FIG. 1 is an isometric view of a peer to peer sale locker apparatus according to an embodiment of the disclosure.
Figure 2:
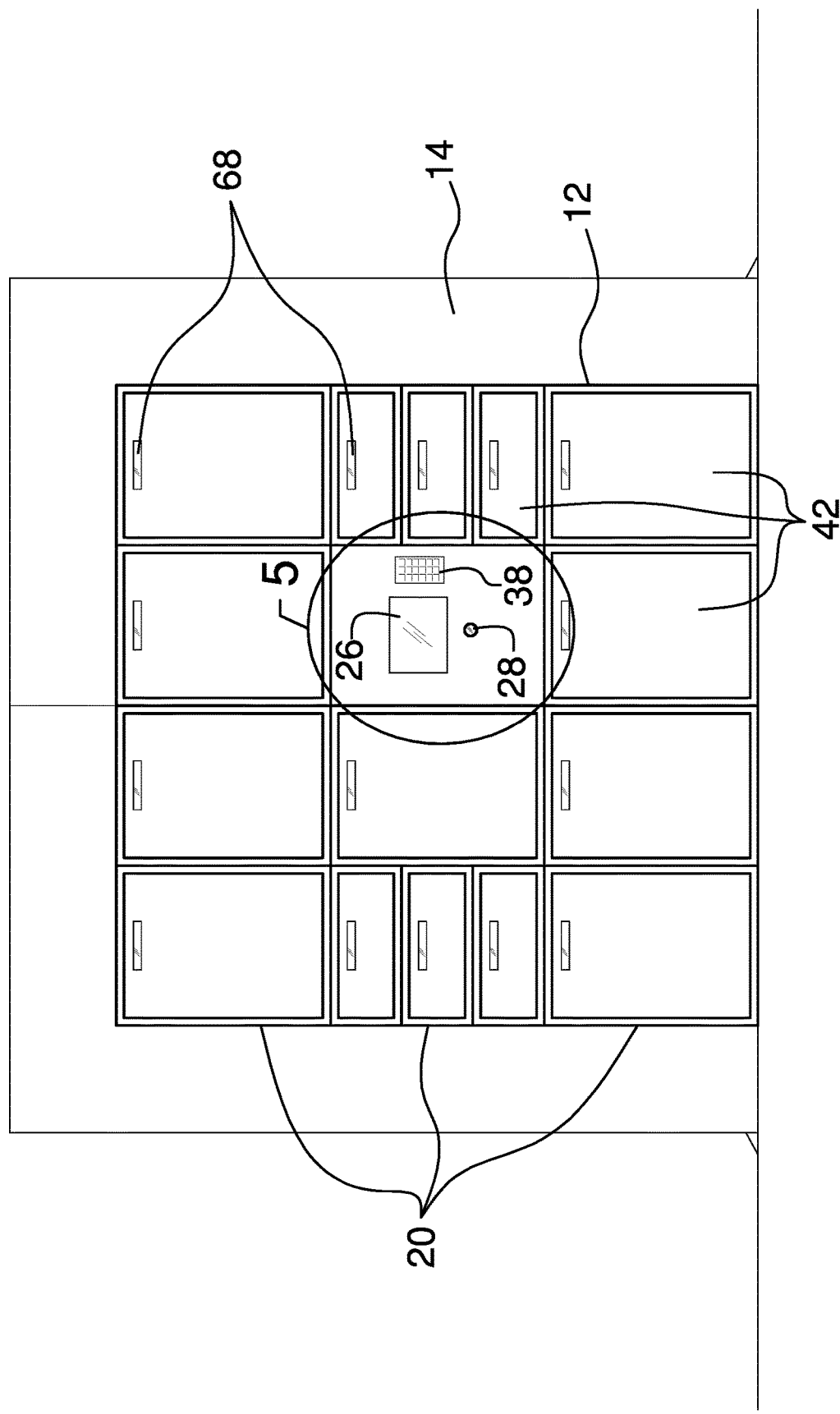
FIG. 2 is a front elevation view of an embodiment of the disclosure.
Figure 3:
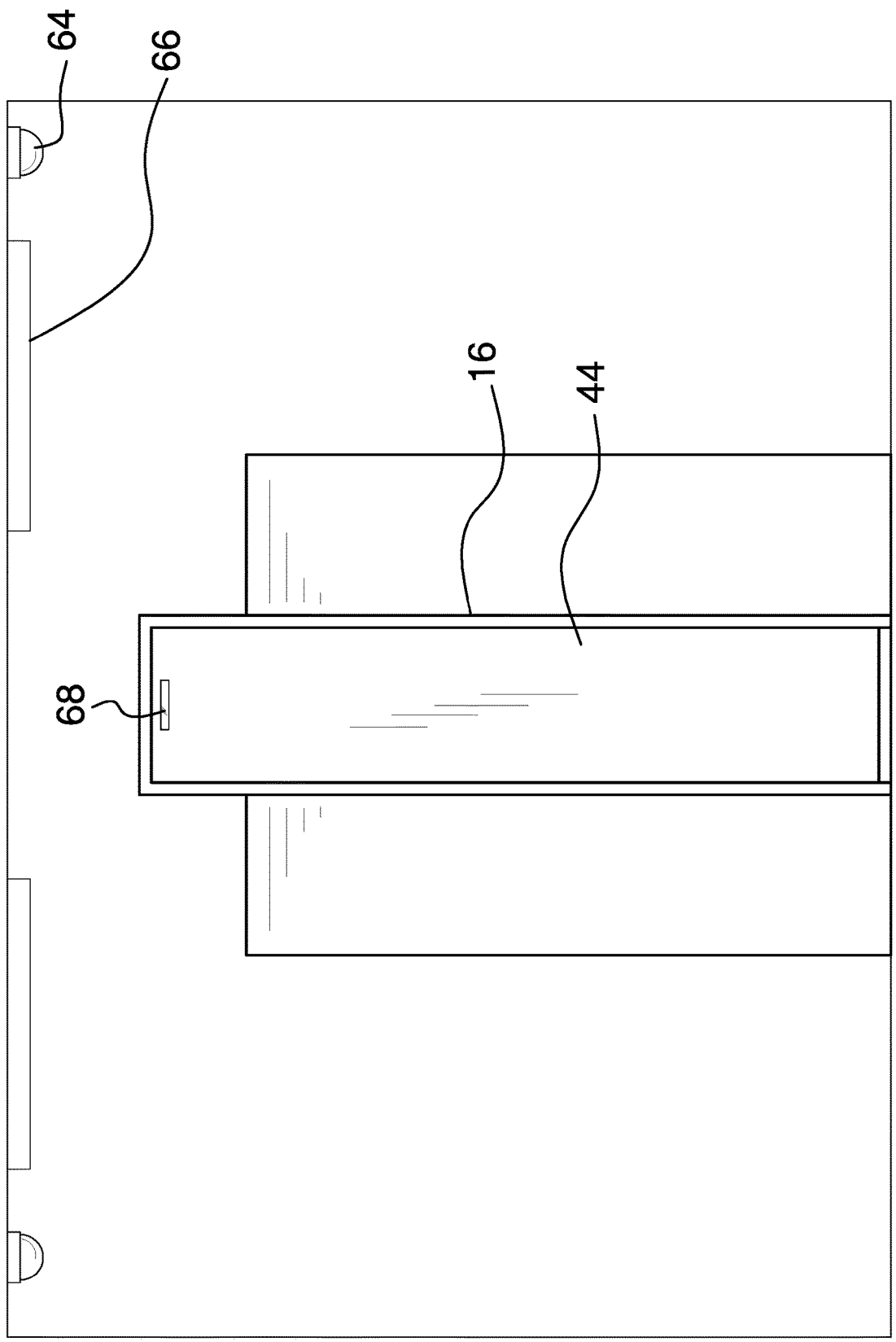
FIG. 3 is a rear elevation view of an embodiment of the disclosure.
Figure 4:
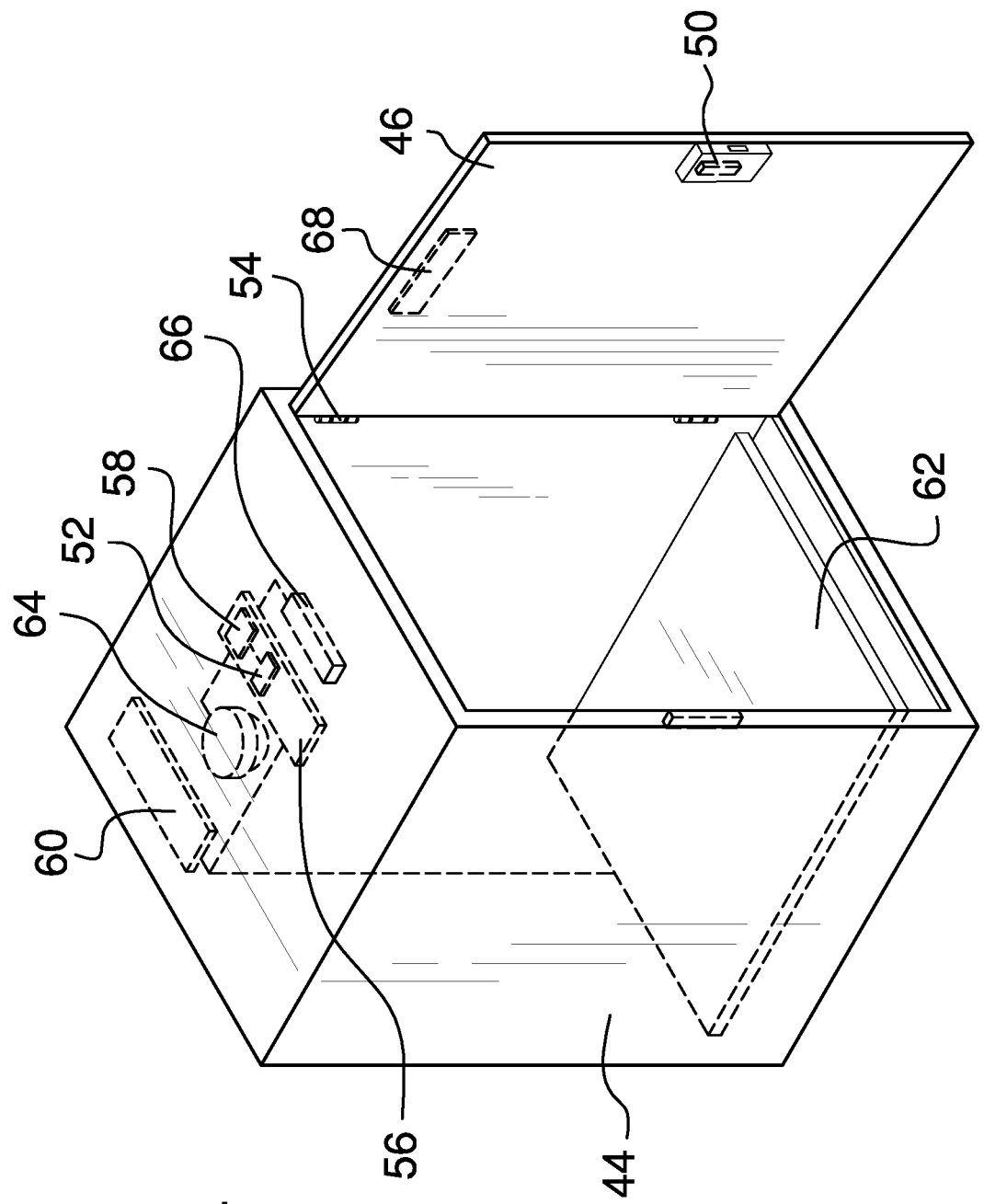
FIG. 4 is an isometric detail view of an embodiment of the disclosure.
Figure 5:
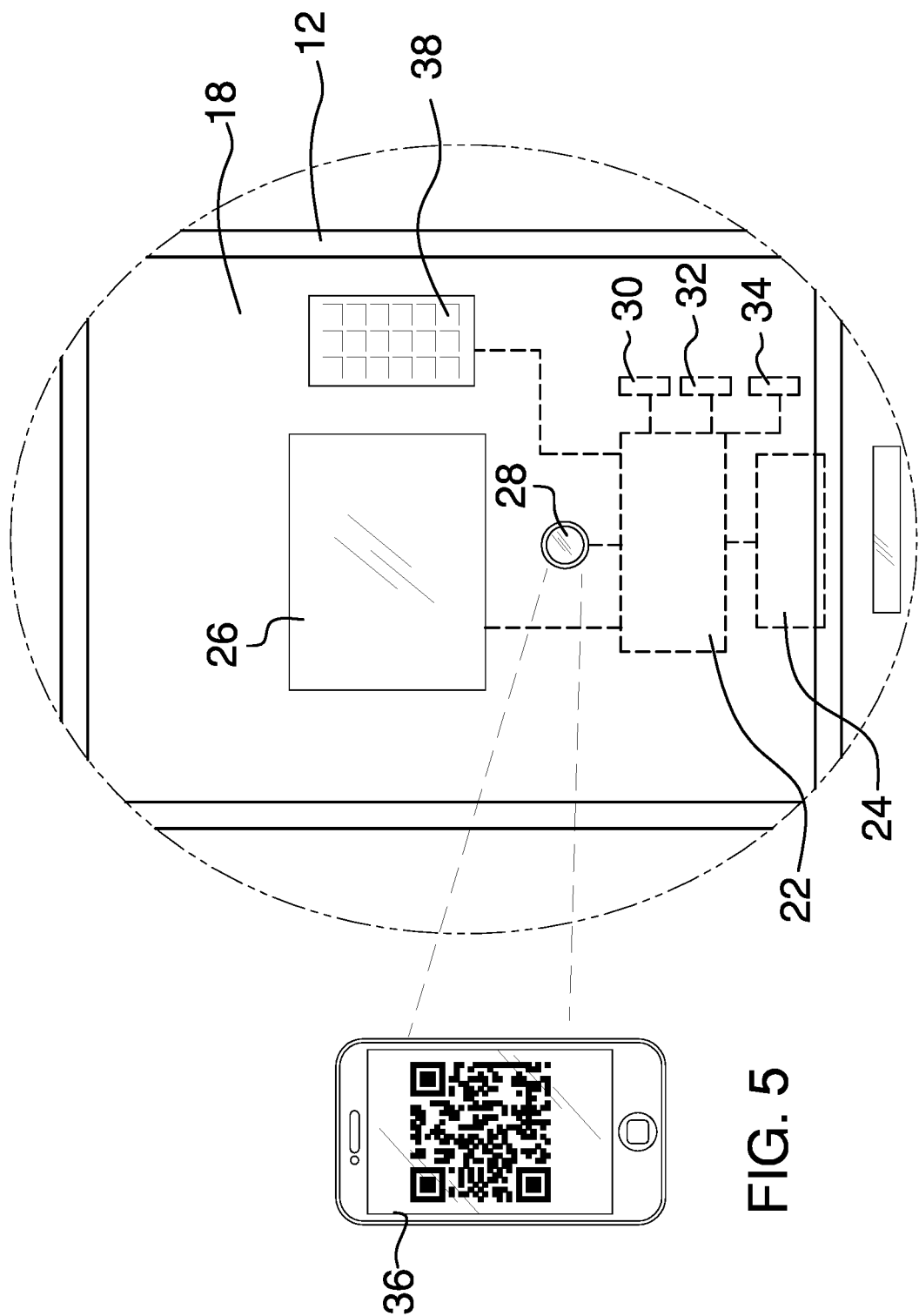
FIG. 5 is a detail view of an embodiment of the disclosure.
Figure 6:
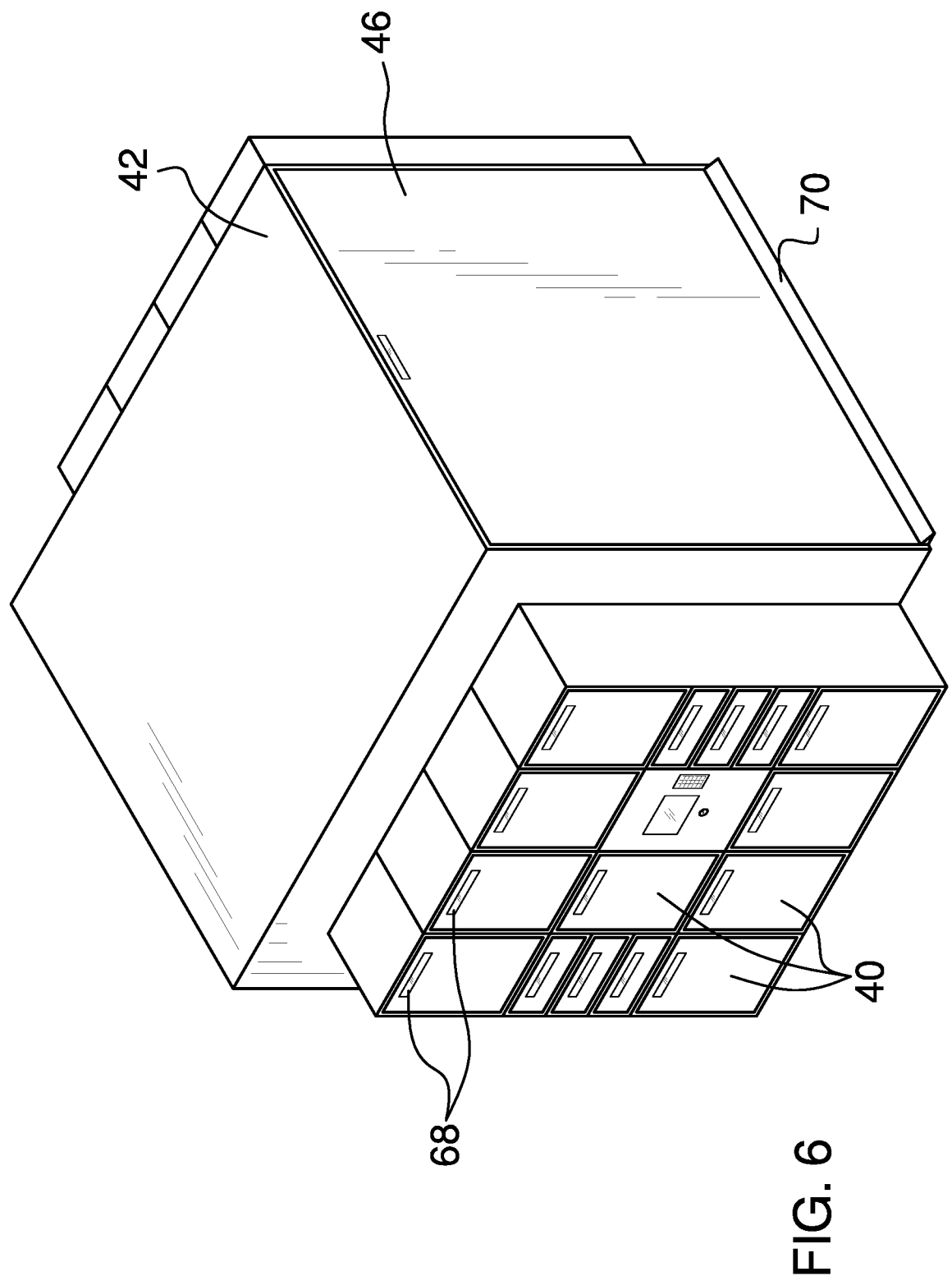
FIG. 6 is an isometric view of an embodiment of the disclosure.
Figure 7:
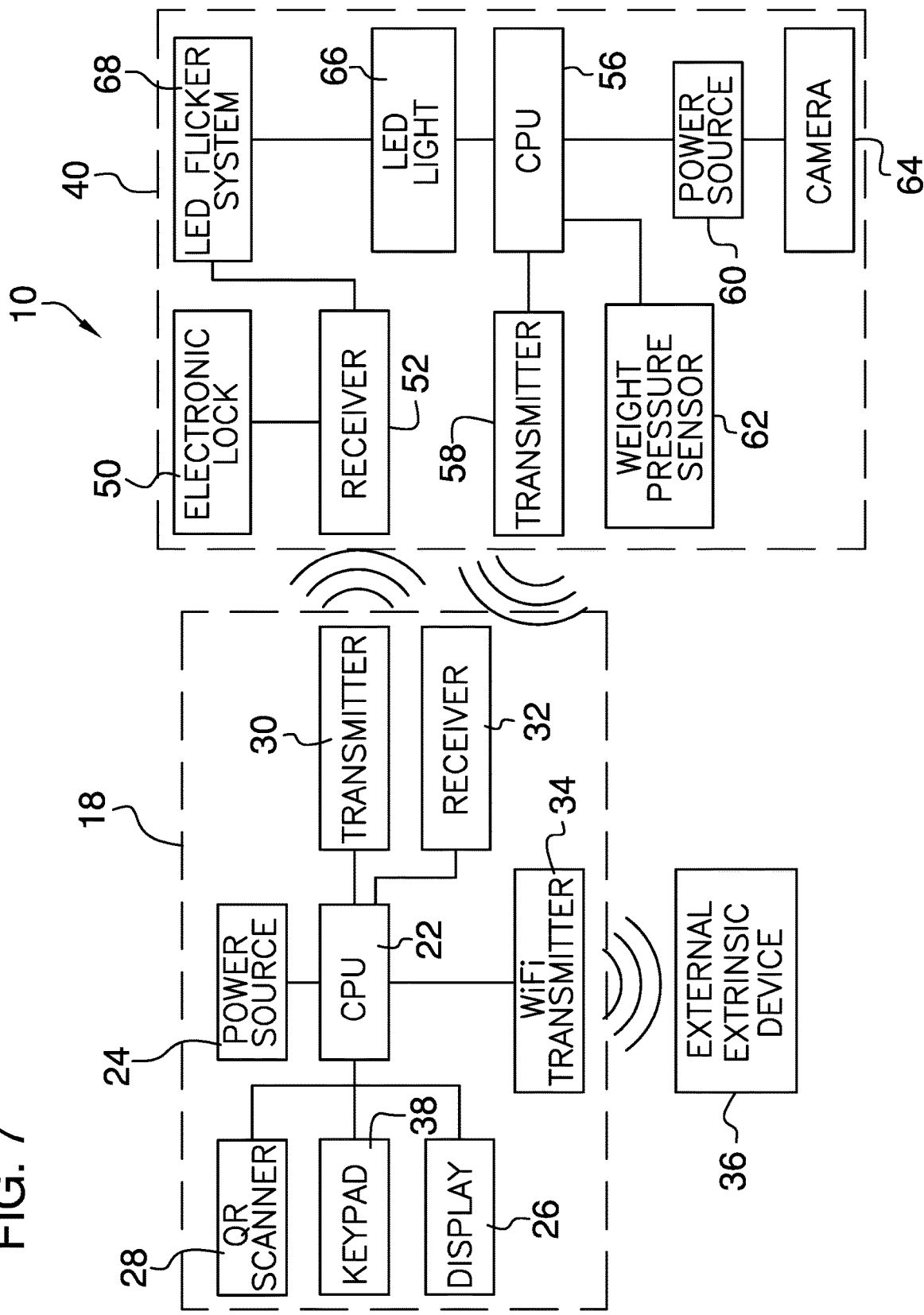
FIG. 7 is a block diagram of an embodiment of the disclosure.

With reference now to the drawings, and in particular to FIGS. 1 through 7 thereof, a new locker device embodying the principles and concepts of an embodiment of the disclosure and generally designated by the reference numeral 10 will be described.

As best illustrated in FIGS. 1 through 7, the peer to peer sale locker apparatus 10 generally comprises a front locker frame 12, a medial locker frame 14 coupled to the front locker frame 12, and a rear locker 16 frame coupled to the medial locker frame 14. The medial locker frame 14 may be both taller and wider than each of the front locker frame 12 and the rear locker frame 16.

A central housing 18 is coupled to the front locker frame 12. The front locker frame 12 may have a set of three locker rows 20 with the central housing 18 disposed in the medial row of the set of locker rows 20 for easiest access and manipulation. A central CPU 22 is coupled within the central housing 18. A central power source 24, a display 26, a scanner 28, a central transmitter 30, a central receiver 32, and a Wi-Fi transceiver 34 are coupled within the central housing 18 and are in operational communication with the central CPU 22. The Wi-Fi transceiver 34 is configured to communicate with an external extrinsic device such as a smartphone 36. There may be a keypad 38 coupled to the central housing 18 and in operational communication with the central CPU 22 if the display 26 is not a touchscreen. The scanner 28 scans QR codes generated on the smartphone 36.

A plurality of locker units 40 is coupled within the front locker frame 12, the medial locker frame 14, and the rear locker frame 16. There may be no more than two locker units 40 of the plurality of locker units occupying the entirety of the medial locker frame 14. Each locker unit 40 coupled within the medial locker frame 14 may extend from the ground to a frame top side 42 of the medial locker frame. The medial locker frame 14 may be dimensioned to receive large commonly traded objects such as, but not limited to, bicycles, surfboards, and the like.

Each locker unit 40 comprises a locker body 44. The locker body 44 of each locker unit in the medial locker frame 14 is oriented perpendicularly to the locker body 44 of each locker unit in the front locker frame 12 and the rear locker frame 16. A locker door 46 is coupled to the locker body 44. The locker door 46 may be hingingly coupled to the locker body 44. The locker door 46 may alternatively be coupled to a drawer 48 slidingly engaged within the locker body 44 as seen in FIG. 1.

An electronic lock 50 is coupled to the locker door 46. The electronic lock 50 has a locker receiver 52 in operational communication with the central transmitter 30. The electronic lock 50 selectively locks and unlocks the locker door 46 to the locker body 44. Each locker door 46 may have a pair of spring hinges 54 to automatically open the locker door 46 when the electronic lock 50 disengages from the locker body 44. A locker CPU 56 is coupled within the locker body 44 and is in operational communication with the electronic lock 50. A locker transmitter 58 and a locker power source 60 are coupled within the locker body 44 and are in operational communication with the locker CPU 56. The locker transmitter 58 is in operational communication with the central receiver 32 to notify the central CPU 22 of the status of the respective locker unit 40.

A weight pressure sensor 62 may be coupled within the locker body 44. The weight pressure sensor 62 is in operational communication with the locker CPU 56 to detect the presence of an object within the locker body 44 and to verify it is the expected weight. A camera 64 may be coupled within the locker body 44 and in operational communication with the locker CPU 56 to further verify the presence of the appropriate object and to monitor who places and removes said object. There may be an internal LED light 66 coupled within the locker body 44 and in operational communication with the locker CPU 56 to illuminate the inside of the locker body 44. An external LED flicker system 68 may be coupled to the locker door 46 and in operational communication with the locker CPU 56 to signal to the user which locker unit 40 contains their object. A ramp 70 may be coupled to the medial locker frame 16 to allow wheeled objects and dollies to be rolled into the respective locker body 44.

In use, the users utilize an application on the smartphone 36 to generate a QR code to be scanned by the scanner 28. They then use the display 26 and the keypad 38 to operate the system. A seller opens one of the locker units 40 and places the object that has been sold within the locker body 44. When the buyer scans the appropriate QR code, that locker unit 40 automatically opens for the item to be retrieved.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:
1. A peer to peer sale locker apparatus comprising:
a front locker frame, a medial locker frame coupled to the front locker frame, a rear locker frame coupled to the medial locker frame, the medial locker frame having a top side spaced vertically higher than respective top sides of the front locker frame and the rear locker frame, the medial locker frame having a width greater than respective widths of the front locker frame and the rear locker frame;
a central housing coupled to the front locker frame;
a central central processing unit (CPU) coupled within the central housing;
a central power source coupled within the central housing, the central power source being in operational communication with the central CPU;
a display coupled to the central housing, the display being in operational communication with the central CPU;
a scanner coupled to the central housing, the scanner being in operational communication with the central CPU;
a central transmitter coupled within the central housing, the central transmitter being in operational communication with the central CPU;
a central receiver coupled within the central housing, the central receiver being in operational communication with the central CPU;
a wireless fidelity transceiver coupled within the central housing, the Wi-Fi transceiver being in operational communication with the central CPU, the Wi-Fi transceiver being configured to communicate with an external extrinsic device; and
a plurality of locker units, the plurality of locker units being coupled within the front locker frame, the medial locker frame, and the rear locker frame, no more than two locker units of the plurality of locker units occupying the entirety of the medial locker frame, each locker unit coupled within the medial locker frame extending from the ground to the frame top side of the medial locker frame, each locker unit comprising:
a locker body;
a locker door coupled to the locker body, the locker door being hingingly coupled to the locker body;
an electronic lock coupled to the locker door, the electronic lock having a locker receiver in operational communication with the central transmitter, the electronic lock selectively locking and unlocking the locker door to the locker body;

a locker CPU coupled within the locker body, the locker CPU being in operational communication with the electronic lock;

a locker transmitter coupled within the locker body, the locker transmitter being in operational communication with the central receiver; and a locker power source coupled within the locker body, the locker power source being in operational communication with the locker CPU.

2. The peer to peer sale locker apparatus of claim 1 further comprising each locker unit having a weight pressure sensor coupled within the locker body, the weight pressure sensor being in operational communication with the locker CPU.

3. The peer to peer sale locker apparatus of claim 1 further comprising each locker unit having a camera coupled within the locker body, the camera being in operational communication with the locker CPU.

4. The peer to peer sale locker apparatus of claim 1 further comprising each locker unit having an internal light emitting diode (LED) light coupled within the locker body, the internal LED light being in operational communication with the locker CPU.

5. The peer to peer sale locker apparatus of claim 1 further comprising each locker unit having an external light emitting diode (LED) flicker system coupled to the locker door, the external LED flicker system being in operational communication with the locker CPU.

6. The peer to peer sale locker apparatus of claim 1 further comprising the locker body of each locker unit in the medial locker frame being oriented perpendicularly to the locker body of each locker unit in the front locker frame and the rear locker frame.

7. The peer to peer sale locker apparatus of claim 1 further comprising a ramp coupled to the medial locker frame.

8. A peer to peer sale locker apparatus comprising:

a front locker frame, a medial locker frame coupled to the front locker frame, a rear locker frame coupled to the medial locker frame, the medial locker frame having a top side spaced vertically higher than respective top sides of the front locker frame and the rear locker frame, the medial locker frame having a width greater than respective widths of the front locker frame and the rear locker frame, the front locker frame and the rear locker frame each being centered between lateral ends of the medial locker frame;

a central housing coupled to the front locker frame;

a central central processing unit (CPU) coupled within the central housing;

a central power source coupled within the central housing, the central power source being in operational communication with the central CPU;

a display coupled to the central housing, the display being in operational communication with the central CPU;

a scanner coupled to the central housing, the scanner being in operational communication with the central CPU;

a central transmitter coupled within the central housing, the central transmitter being in operational communication with the central CPU;

a central receiver coupled within the central housing, the central receiver being in operational communication with the central CPU;

a wireless fidelity transceiver coupled within the central housing, the Wi-Fi transceiver being in operational communication with the central CPU, the Wi-Fi transceiver being configured to communicate with an external extrinsic device;

a plurality of locker units coupled within the front locker frame, the medial locker frame, and the rear locker frame, no more than two locker units of the plurality of locker units occupying the entirety of the medial locker frame, each locker unit coupled within the medial locker frame extending from the ground to a frame top side of the medial locker frame, each locker unit comprising:

a locker body, the locker body of each locker unit in the medial locker frame being oriented perpendicularly to the locker body of each locker unit in the front locker frame and the rear locker frame;

a locker door coupled to the locker body, the locker door being hingingly coupled to the locker body;

an electronic lock coupled to the locker door, the electronic lock having a locker receiver in operational communication with the central transmitter, the electronic lock selectively locking and unlocking the locker door to the locker body;

a locker CPU coupled within the locker body, the locker CPU being in operational communication with the electronic lock;

a locker transmitter coupled within the locker body, the locker transmitter being in operational communication with the central receiver;

a locker power source coupled within the locker body, the locker power source being in operational communication with the locker CPU;

a weight pressure sensor coupled within the locker body, the weight pressure sensor being in operational communication with the locker CPU;

a camera coupled within the locker body, the camera being in operational communication with the locker CPU;

an internal light emitting diode (LED) light coupled within the locker body, the internal LED light being in operational communication with the locker CPU;

an external LED flicker system coupled to the locker door, the external LED flicker system being in operational communication with the locker CPU; and a ramp coupled to the medial locker frame.

\* \* \* \* \*